Feb. 1, 1955     G. A. STROM, JR     2,701,055
BALL-INSPECTION APPARATUS
Filed July 9, 1953
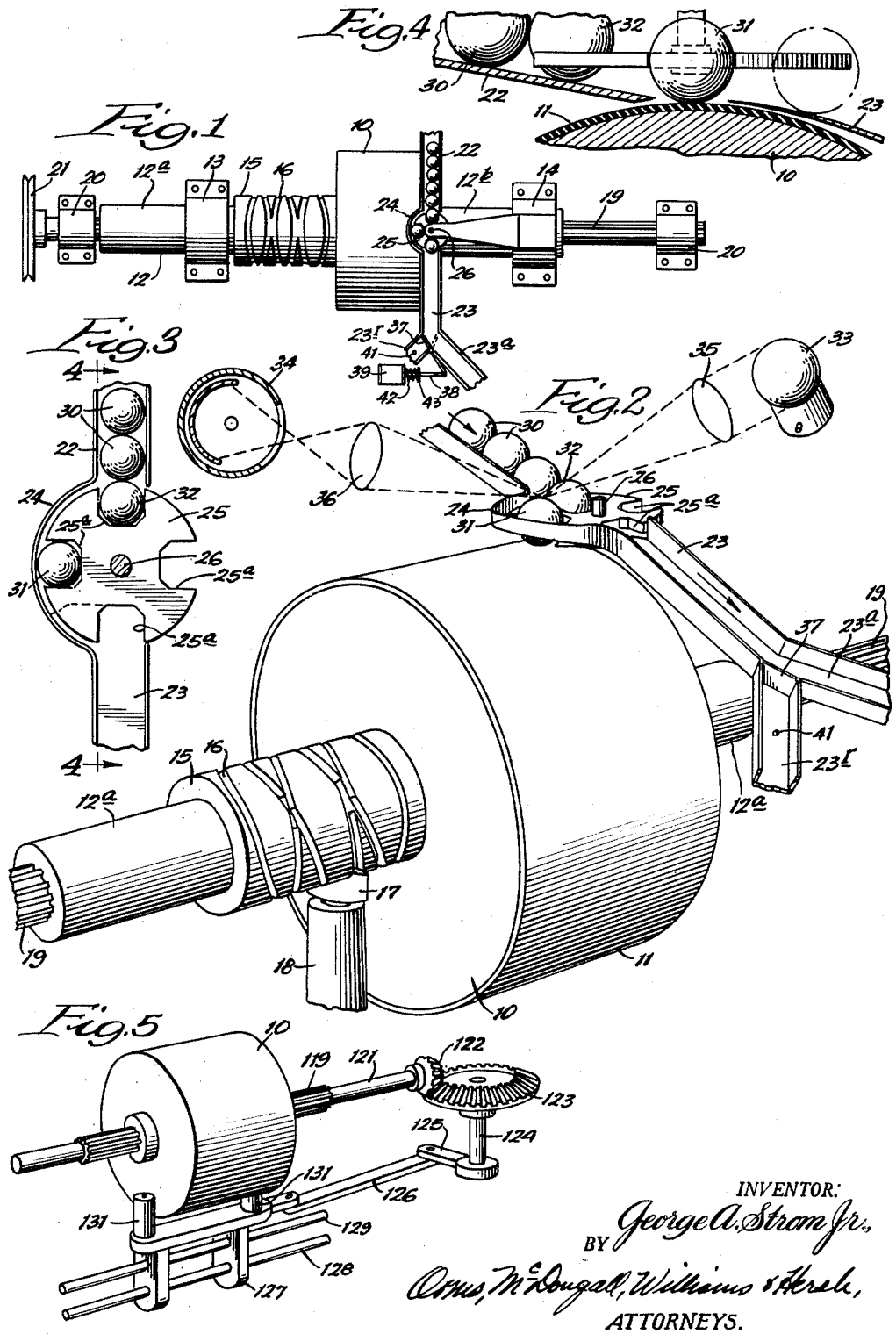
INVENTOR.
George A. Strom Jr.
BY
Orms, McDougall, Williams & Herale,
ATTORNEYS.

United States Patent Office 2,701,055
Patented Feb. 1, 1955

2,701,055

BALL-INSPECTION APPARATUS

George A. Strom, Jr., Cicero, Ill.

Application July 9, 1953, Serial No. 366,893

3 Claims. (Cl. 209—111)

This invention relates to ball-inspection apparatus; in particular, it concerns an automatic apparatus for photo-electric inspection of surface imperfections.

Balls, commonly made of steel but sometimes made of other materials, are widely used in bearings and other applications in which a very high degree of perfection is required, both as to dimensions and as to surface uniformity. This situation requires that manufacturers of balls use great care in inspecting their products, and a substantial part of the cost of accurately machined balls is attributable to inspection.

Various types of automatic machines have been developed and used in certain phases of the inspection operation, such as inspection for sphericity, weight, and size. Inspection for surface flaws, however, has never before, so far as I know, been successfully accomplished by automatic means. The present invention provides an apparatus by which accurate ball inspection for detection of surface flaws can be accomplished automatically.

In carrying out my invention, I employ the familiar photo-electric technique, wherein a light beam is reflected off the object to be studied and intercepted by a photo-electric cell. That method of inspection is broadly old, having been used in the past for inspection of a great many different types of objects. Accordingly, it is to be understood that I do not claim the photo-electric technique as my invention except as part of my novel combination which permits photo-electric inspection of balls for surface flaws.

The principal object of my invention is to provide an automatic apparatus in which balls can be successively subjected to surface inspection by photo-electric means, with assurance that the entire surface of each ball will be critically examined.

A further object of my invention is to provide a ball-inspection machine having automatic means for bringing balls successively to an inspection station and rapidly moving each ball in turn, during the inspection process, through a complex pattern of movement effective to bring the entire surface of the ball under the surveillance of a sharply focused light beam.

Still another object of the present invention is to provide a ball-inspecting machine wherein means are provided for automatically inspecting, in rapid succession, the entire surface of each of a plurality of balls, and rejecting automatically any ball which exhibits surface flaws or discontinuities.

Other objects and advantages of the present invention will be apparent from the detailed description of the invention which follows.

In the accompanying drawing I have shown, somewhat diagrammatically, a typical embodiment of my invention. In the drawing, Figure 1 is a fragmentary plan view showing most of the essential mechanical parts of my ball-inspection apparatus. Fig. 2 is a perspective view of the inspection station, bringing out in considerable detail the mechanical operation and showing diagrammatically the manner in which the photo-electric and the mechanical operations are coordinated. Fig. 3 is an enlarged plan view, partly in section, of a portion of the apparatus shown in Fig. 1. Fig. 4 is a sectional view in the vertical plane taken along the line 4—4 of Fig. 3. Fig. 5 is a perspective view showing an alternative driving arrangement for the drum which forms an important part of my invention.

In the drawing I have, for the sake of simplicity, omitted all purely structural or supporting parts, such as frames.

It will be understood that the various parts of the structure are suitably mounted in substantially the relative positions shown. An important element of my invention is a cylindrical drum 10, which may be made of any desired material and of any convenient dimensions. I prefer that the drum 10 be substantially larger in radius than the balls to be examined. The outer circumferential surface of drum 10 is preferably covered with a coating or skin 11 made of soft rubber or other suitable material characterized by a high coefficient of friction. As will be seen presently, the purpose of coating 11 is to provide a surface on which a freely resting ball will roll with sufficient friction to cause complex movement of drum 10 to impart corresponding complex movement to the ball.

Drum 10 is rigidly joined to a central hub element 12, which extends axially a substantial distance beyond drum 10 and which carries a pair of rather elongated cylindrical bearing surfaces 12a, at opposite ends of hub element 12 and respectively on opposite sides of drum 10. Bearing surfaces 12a respectively cooperate with fixed bearings 13 and 14, which are carried by the frame (not shown) and which are substantially smaller in the axial dimension than the bearing surfaces 12a.

Hub element 12 is also provided with a cam element 15 disposed between the drum 10 and one of the bearing surfaces 12a. Cam element 15 is provided with a double spiral groove 16, re-entrantly arranged at its respective terminals, as shown in Figs. 1 and 2. A cam follower 17, suitably mounted on frame-supported boss 18, rides in groove 16, as shown in Fig. 2.

Hub element 12 is provided with a central axial aperture cut with axial splines, hub member 12 being slidably mounted on splined shaft 19. Shaft 19 is supported in suitable bearings 20, and a suitable means, such as pulley 21, is provided for rotating shaft 19.

Suitably mounted over drum 10 is a feed channel or race 22, through which the balls to be inspected are permitted to roll down to the inspection station. A discharge race 23 provides a channel through which the balls leave the inspection station. Races 22 and 23 are both provided with side walls which are joined together by means of a curved extension wall 24, disposed directly over drum 10 and providing a retaining means which assists in holding the balls in position during the inspection operation.

Suitably mounted between feed race 22 and discharge race 23 is a turnstile element 25, provided with a plurality of notches 25a of suitable size for receiving a ball for inspection. Turnstile element 25 is mounted on a vertical shaft 26. As will be presently described in greater detail, shaft 26, and hence turnstile 25, are rotated intermittently during machine operation, the turnstile element being the means used for taking the balls in succession, one at a time, from the feed race 22, subjecting them to inspection, and feeding them into the discharge race 23.

In the embodiment shown, turnstile element 25 is provided with four notches 25a, and its intermittent rotational movement occurs in steps of 90°. As a result, as balls 30 come down the feed race 22, they will in succession run into notches 25a, so that at any particular time, a ball 31 will occupy the notch midway between races 22 and 23, while another ball, designated 32, will occupy the notch 25a which is aligned with the lower end of feed race 22. While each successive ball 31 occupies the position midway between the two races, it is photo-electrically inspected, and then passes into discharge race 23 when the turnstile element 25 undergoes its next 90° rotation.

Suitably mounted above the turnstile element 25 are a light source 33 and a photo-electric cell 34, together with suitable focusing lenses 35 and 36. These elements are arranged so that the light from source 33 is focused onto a small area on the surface of the particular ball 31 which at any given time occupies the inspection position midway between the two races. Light reflected off that small surface of ball 31 is then focused by lens 36 into a beam which strikes the photo-sensitive element of cell 34.

The degree of focusing employed and the smallness of the area of reflection from ball 31 are a matter of choice, to be determined by the standards of accuracy required in the particular inspection operation. Generally speaking, the smaller the area of ball 31 illuminated by the focused beam from source 33, the greater will be the precision of the inspection operation.

Since photo-electric inspection is broadly a familiar technique, I have not in the present specification shown in detail any of the conventional electrical apparatus associated therewith, such as the amplifier normally driven by electric impulses from cell 34.

The discharge race 23 may be provided with any desired apparatus for separating accepted balls from rejected balls responsively to electrical signals originating in cell 34. In the particular embodiment shown, I have provided for discharge race 23 a forked continuation consisting of one race 23a, through which accepted balls may roll to a suitable place of storage, and a second race 23r, through which the rejected balls may roll. The junction between races 23a and 23r are under the control of a pivoted gate 37, operated through suitable linkage 38 by solenoid 39.

Reject race 23r may be provided with any suitable electrical means, such as button switch 41, for restoring gate 37 to its normal position following passage of a ball down the reject race 23r.

Operation

In the operation of my invention, it will be understood that shaft 19 is rotated continuously. Cam follower 17, running in groove 16, compels the drum 10 to move back and forth in the axial direction in a systematic pattern of movement controlled by the shape of groove 16, while at the same time drum 10 rotates on its axis in synchronism with the rotation of shaft 19.

This complex movement of drum 10 is transmitted to ball 31, resting on the coating 11, as shown in Fig. 4. Ball 31 will roll and at the same time undergo a continuous precession. That is, as the ball rolls responsively to the rotation of drum 10, it will at the same time roll slowly in the perpendicular direction responsively to the axial movement of drum 10. As a result, the entire surface of ball 31 will be brought under and illuminated by the light from source 33 within a short time after ball 31 comes into its inspection position whereat it is set in motion by drum 10. The rate at which sidewise rolling of ball 31 takes place will be of course governed by the pitch of groove 16. Similarly, the rate at which such sidewise rolling may be permitted depends on the size of the area "scanned" by the beam from light 33. The smaller the scanned area, the more gradual must be the shifting of the axis of rotation of ball 31, since the entire surface of the ball must be exposed to the beam from source 33. The precise angle of pitch to be employed in groove 16 is thus a matter of design to be determined in connection with the size of the ball area illuminated by the beam during the inspection operation.

Similarly, the rate of intermittent rotation of turnstile element 25 is a matter of design, determined by the pitch of groove 16 and by the relative sizes of the drum 10 and the balls being inspected. Each rotational step of turnstile element 25 discharges a ball into the discharge race and accepts a new ball for inspection from feed race 22. Thus the interval between rotational movements of turnstile element 25 should be substantially equal to (or slightly greater than) the time required for complete inspection of a ball by the photo-electric apparatus. That time, as will be apparent to persons skilled in the art, depends on the rate of rotation of the ball 31 and the rate of shifting of the ball axis responsively to axial movement of drum 10. Any suitable mechanical linkage, as by a ratchet or a Geneva movement, may be provided for coordinating the intermittent rotation of turnstile element 25 and the continuous rotation of shaft 19. The frequency of rotation of turnstile element 25 will be designed in accordance with the factors just indicated, regardless of what particular type of mechanical movement is used.

Incidentally, it should be noted that nothing is lost, so far as accuracy of inspection is concerned, by having the frequency of rotation of turnstile element 25 slower than it need be. The only effect of slowing down the frequency of rotation of turnstile element 25 is to subject each ball to photo-electric scanning for a longer period of time, so that certain portions of its surface may be inspected more than once. Obviously, however, that is not inherently objectionable, except insofar as it makes the operation slower.

The most desirable design compromise in fixing the rate of axial shift of drum 10, the speed of rotation of shaft 19, and the frequency of rotation of turnstile 25 is to achieve an inspection rate which insures that the entire surface of each ball will be scanned by the light beam, with a minimum of re-inspection.

By relay means (not shown), it will be obvious and well-known to persons skilled in the art, solenoid 39 may be caused to throw gate 37 to the dotted-line position of Fig. 1 whenever photo-electric inspection of a particular ball 31 reveals a surface flaw, since any irregularity or discontinuity on the ball surface will cause a change in the intensity of the reflected light intercepted by cell 34. Changes in such light intensity are transformed by cell 34 into electrical potential changes which, suitably amplified, may be caused to energize solenoid 39. Once energized, solenoid 39 may be kept energized by means of a holding coil or other suitable expedient until the rejected ball, rolling over switch 41, breaks the holding circuit of solenoid 39 or otherwise electrically effects the return of gate 37 to its normal position, as shown in solid lines in Fig. 1. Gate 37 is held in its normal, solid-line position by spring 42 during periods when solenoid 39 is not energized, spring 42 being seated between the casing of solenoid 39 and spring seat 43.

From the foregoing, it will be seen that the cycle of operation causes each ball in turn rolling down race 22 to be picked up by turnstile 25, inspected while it is in the intermediate position occupied in the drawing by ball 31, and then discharged into race 23. Those balls found acceptable by the photo-electric cell are allowed to roll into race 23a, while rejected balls are guided into reject race 23r.

The Fig. 5 modification

Fig. 5 is a fragmentary perspective view showing a simple alternative means for accomplishing the axial movement of drum 10. In Fig. 5, drum 10 is carried as before on a splined shaft 119. Shaft 119, however, is provided with an extension 121 which terminates in a bevel gear 122. Gear 122 drives a horizontally mounted bevel gear 123 and thus rotates vertical shaft 124. Shaft 124 carries a crank arm 125 which is connected by means of a link 126 to a sliding carriage 127. Sliding carriage 127 is free to move back and forth on frame-supported rods 128 and 129. Carriage 127 carries a pair of thrust rollers 131, between which drum 10 is snugly held.

As will be seen from Fig. 5, rotation of shaft 119 will cause rotation of drum 10 and will at the same time bring about axial movement of drum 10 responsively to shifts in the position of carriage 127.

The Fig. 5 structure produces a harmonic or sinusoidal rate of axial movement for drum 10. This is not objectionable except to the extent that it may require some greater degree of "re-inspection," that is, scanning of some ball areas more than once. The Fig. 5 structure is in that respect less flexible than the grooved-cam structure of Fig. 1, since the groove 16 may be cut, if desired, to make the axial movement of drum 10 virtually linear with time. On the other hand, the modification of Fig. 5 is mechanically simpler to construct, and it has the advantage that change in the relative rates of rotation and axial movement of drum 10 can easily be accomplished merely by changing the relative sizes of bevel gears 122 and 123.

While I have in this specification described in considerable detail certain specific embodiments of my invention, it is to be understood that that description is illustrative only, and that persons skilled in the art can make many changes in matters of details without departing from the spirit of my invention. Particularly, it is to be understood that the described apparatus for guiding the balls to a position for inspection, holding them fixed against lateral movement during inspection, and passing them onward to storage may be replaced by any one of many other conventional arrangements. The essence of the invention lies in the cooperating means by which a ball may be automatically held against lateral movement and at the same time rolled with a complex motion operative to subject its entire surface quickly and automatically to photo-electric inspection.

For example, the relatively simple ball-feeding and holding apparatus shown in the specific examples herein described afford means for inspecting only one ball at a time, whereas, as will be obvious to persons skilled in the art, the surface of the drum 10 may be employed for simultaneous inspection of a large plurality of balls specified at various points on its surface. Similarly, it will be obvious that the function performed by the drum 10 can be accomplished by means of frictional surfaces of other conformations, such, for example, as a flat plate, provided it be suitably moved in the necessary manner to impart the appropriate complex motion to the balls being inspected. Such modifications are within the spirit and scope of my invention.

I claim:

1. In an automatic ball-inspection machine, holding means for securing a ball against lateral movement while leaving it free to rotate in any axis, feeding means for supplying successively to said holding means a plurality of balls for inspection, a light source, means associated with said light source for directing a concentrated beam of light on a small area of a ball confined in said holding means, a photo-electric cell mounted near said holding means in a position in which light reflected from said small area will impinge upon said cell, a cylindrical roller so positioned adjacent said holding means that a ball confined therein will engage the surface of said roller, said roller being provided with a surface characterized by a high coefficient of friction with said ball, means for rotating said cylindrical roller, and means operative simultaneously with said last-mentioned means for moving said roller axially while it rotates, whereby said roller will impart to said ball confined in said holding means simultaneous rotation around two distinct axes.

2. Apparatus according to claim 1 provided also with means for releasing a ball from said holding means after a predetermined period of rotation therein and replacing the same with another ball from said feeding means.

3. Apparatus according to claim 1 provided also with means for releasing a ball from said holding means after a predetermined period of rotation therein and replacing the same with another ball from said feeding means, and having exit means adapted to receive balls released from said holding means, said exit means comprising selector mechanism controlled by said photoelectric cell operative to segregate balls from the surface of which the reflected light exhibits changes in intensity exceeding a predetermined magnitude.

References Cited in the file of this patent

UNITED STATES PATENTS

| 1,640,567 | Firestone | Aug. 30, 1927 |
| 2,051,695 | Glacy | Aug. 18, 1936 |
| 2,354,628 | Whitesell | July 25, 1944 |